(12) United States Patent
Yan

(10) Patent No.: US 12,079,408 B2
(45) Date of Patent: Sep. 3, 2024

(54) TOUCH DISPLAY PANEL

(71) Applicant: TCL China Star Optoelectronics Technology Co., Ltd., Guangdong (CN)

(72) Inventor: Sen Yan, Guangdong (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/765,462

(22) PCT Filed: Mar. 21, 2022

(86) PCT No.: PCT/CN2022/082007
§ 371 (c)(1),
(2) Date: Mar. 31, 2022

(87) PCT Pub. No.: WO2023/168750
PCT Pub. Date: Sep. 14, 2023

(65) Prior Publication Data
US 2024/0053845 A1    Feb. 15, 2024

(30) Foreign Application Priority Data
Mar. 9, 2022   (CN) .......................... 202210221874.4

(51) Int. Cl.
*G06F 3/041*    (2006.01)
*G06F 3/0354*   (2013.01)
(Continued)

(52) U.S. Cl.
CPC ............ *G06F 3/0412* (2013.01); *G06F 3/046* (2013.01); *G06F 3/047* (2013.01);
(Continued)

(58) Field of Classification Search
CPC ........ G06F 3/0412; G06F 3/046; G06F 3/047; G06F 3/03545; G06F 2203/04103; G06F 2203/04114; G06F 3/0416; H01Q 7/00
See application file for complete search history.

(56) References Cited

U.S. PATENT DOCUMENTS 9,612,702 B2 * 4/2017 Jiang ................... G06F 3/04164
10,860,149 B2   12/2020 Lin et al.
(Continued)

FOREIGN PATENT DOCUMENTS

CN    105511685    4/2016
CN    107526227    12/2017
(Continued)

OTHER PUBLICATIONS

International Search Report and the Written Opinion Dated Nov. 28, 2022 From the International Searching Authority Re. Application No. PCT/CN2022/082007 and Its Translation Into English. (18 Pages).
(Continued)

*Primary Examiner* — Mihir K Rayan

(57) ABSTRACT

A touch display panel has a display area and a non-display area and includes pixel units located in the display area and two antenna layers. The pixel units are arranged in an array, and the two antennas are stacked and insulated from each other. Each antenna layer includes a plurality of antenna groups, and each of gaps between adjacent pixel units is provided with an antenna group. Extending directions of the antennas in each antenna layer are same and extending directions of the antennas in the two antenna layers are perpendicular to each other.

20 Claims, 4 Drawing Sheets

(51) Int. Cl.
  *G06F 3/046* (2006.01)
  *G06F 3/047* (2006.01)
  *H01Q 7/00* (2006.01)

(52) U.S. Cl.
  CPC .......... *G06F 3/03545* (2013.01); *G06F 3/041* (2013.01); *G06F 3/0416* (2013.01); *G06F 2203/04103* (2013.01); *G06F 2203/04114* (2019.05); *H01Q 7/00* (2013.01)

(56) References Cited

U.S. PATENT DOCUMENTS

| | | | | |
|---|---|---|---|---|
| 11,714,502 | B2 * | 8/2023 | Zhou | G06F 3/0412 |
| | | | | 345/174 |
| 2018/0335886 | A1 * | 11/2018 | Liu | G06F 3/04166 |
| 2022/0197443 | A1 * | 6/2022 | Kim | G06F 3/0412 |

FOREIGN PATENT DOCUMENTS

| | | |
|---|---|---|
| CN | 208298145 | 12/2018 |
| CN | 109491554 | 3/2019 |
| CN | 110083280 | 8/2019 |
| CN | 110580118 | 12/2019 |
| CN | 112286384 | 1/2021 |
| CN | 113589976 | 11/2021 |
| CN | 113655920 | 11/2021 |
| CN | 114020179 | 2/2022 |
| KR | 10-2015-0030065 | 3/2015 |

OTHER PUBLICATIONS

Notification of Office Action and Search Report Dated Feb. 24, 2024 From The State Intellectual Poperty Office of the People's Republic of China Re. Application No. 202210221874.4 and Its Translation Into English. (15 Pages).

* cited by examiner

TOUCH DISPLAY PANEL

RELATED APPLICATIONS

This application is a National Phase of PCT Patent Application No. PCT/CN2022/082007 having International filing date of Mar. 21, 2022, which claims the benefit of priority of Chinese Patent Application No. 202210221874.4 filed on Mar. 9, 2022. The contents of the above applications are all incorporated by reference as if fully set forth herein in their entirety.

FIELD AND BACKGROUND OF THE INVENTION

The present application relates to the field of display technologies, and more particularly to a touch display panel.

In the past ten years, with the continuous development of a touch display industry, different types of touch technologies such as acoustic wave, infrared, resistive, capacitive, and electromagnetic induction have been successively developed, and a relatively mature industry has gradually formed. Electromagnetic induction touch technology is a technology that uses an electromagnetic pen to emit electromagnetic signals and interact with an electromagnetic induction board behind a touch screen. Electromagnetic induction touch technology has many advantages, such as accurate positioning, sensitivity, original pen display, no fear of scratches, good positioning uniformity, no fear of accidental touch, and strong anti-interference ability of antennas, and has a wide market application prospect.

With the continuous improvement of users' demands for thinner and lighter products, in order to further reduce a thickness of a touch display panel, an electromagnetic induction antenna needs to be integrated into the display panel. In a conventional electromagnetic induction touch display panel, antennas located in a display area are distributed in a gap between a part of pixels. This causes the offset antenna to affect an aperture ratio of the pixels adjacent to the antenna when the panel has a process offset. As a result, differences in aperture ratios are generated between the pixels, causing uneven brightness of the touch display panel when displaying a pure grayscale image. Also known as a mura phenomenon in the industry, it seriously affects a display performance, and this issue needs to be solved urgently.

Technical Problem

The present application provides a touch display panel, which can effectively solve issues of uneven brightness and degraded display image performance of a conventional touch display panel caused by an antenna offset issue inside a panel.

SUMMARY OF THE INVENTION

The present application provides a touch display panel having a display area and a non-display area, wherein the touch display panel comprises: pixel units located in the display area and two antenna layers, wherein the pixel units are arranged in an array, the two antennas are stacked and insulated from each other, each of the antenna layers comprises a plurality of antenna groups, and one of the antenna groups is provided at a gap between adjacent pixel units, each of the antenna groups comprises at least one antenna, extending directions of the antennas in each of the antenna layers are same, and extending directions of the antennas in the two antenna layers are perpendicular to each other.

Optionally, in one of the antenna layers, distances between adjacent antenna groups are same, and a number of the antennas in each of the antenna groups is same.

Optionally, the plurality of the antenna groups in each of the antenna layers comprises first antenna groups and second antenna groups, the second antenna group is located between two adjacent first antenna groups, each of the antenna layers further comprises peripheral wirings and connecting wires arranged in the non-display area, in one of the antenna layers, two ends of the first antenna groups of each two groups are respectively electrically connected through the peripheral wirings and the connecting wires.

Optionally, each of the antenna layers comprises one of the connecting wires and a plurality of groups of the peripheral wirings, in one of the antenna layers, one end of the first antenna group is electrically connected to the connecting wires, and another end of the first antenna group is electrically connected to corresponding peripheral wirings.

Optionally, in one of the antenna layers, the second antenna group is insulated from the connecting wires and the peripheral wirings.

Optionally, in one of the antenna layers, the second antenna group is electrically connected to the connecting wires and insulated from the peripheral wirings.

Optionally, two adjacent first antenna groups belong to different signal channels.

Optionally, each of the antenna layers further comprises peripheral wirings and connecting wires disposed in the non-display area, in one of the antenna layers, a plurality of the antenna groups are equally divided into a plurality of antenna groups, each of the antenna groups comprises a plurality of adjacent antenna groups, and each of the antenna groups comprises a same number of the antenna groups, in one of the antenna layers, two ends of each of the two antenna groups are electrically connected through the peripheral wiring and the connecting wires, respectively.

Optionally, each of the antenna layers comprises one of the connecting wires and a plurality of groups of the peripheral wirings, in one of the antenna layers, one end of the antenna group is electrically connected to the connecting wires, and another end of the antenna group is electrically connected to corresponding peripheral wirings.

Optionally, two adjacent antenna groups belong to different signal channels.

Optionally, the touch display panel further comprises a metal layer, the metal layer comprises a plurality of data lines extending in a same direction, and one of the antenna layers is disposed on a same layer as the metal layer.

Optionally, each of the antenna groups comprises a plurality of antennas, and distances between adjacent antennas in each of the antenna groups are same.

Beneficial Effect

The touch display panel provided by the present application includes pixel units located in the display area and two antenna layers. Each of the antenna layers includes a plurality of antenna groups, and one of the antenna groups is provided at the gap between the adjacent pixel units. Each of the antenna groups includes at least one antenna. In the present application, an antenna group including at least one antenna is provided at a gap between adjacent pixel units. Therefore, when a process offset occurs in the touch display panel, each of the pixel units is uniformly affected by an antenna offset. Therefore, there is no difference in an aperture ratio, an occurrence of a mura phenomenon is avoided, and a display performance of the touch display panel is effectively improved.

DESCRIPTION OF SPECIFIC EMBODIMENTS OF THE INVENTION

Figure 1:
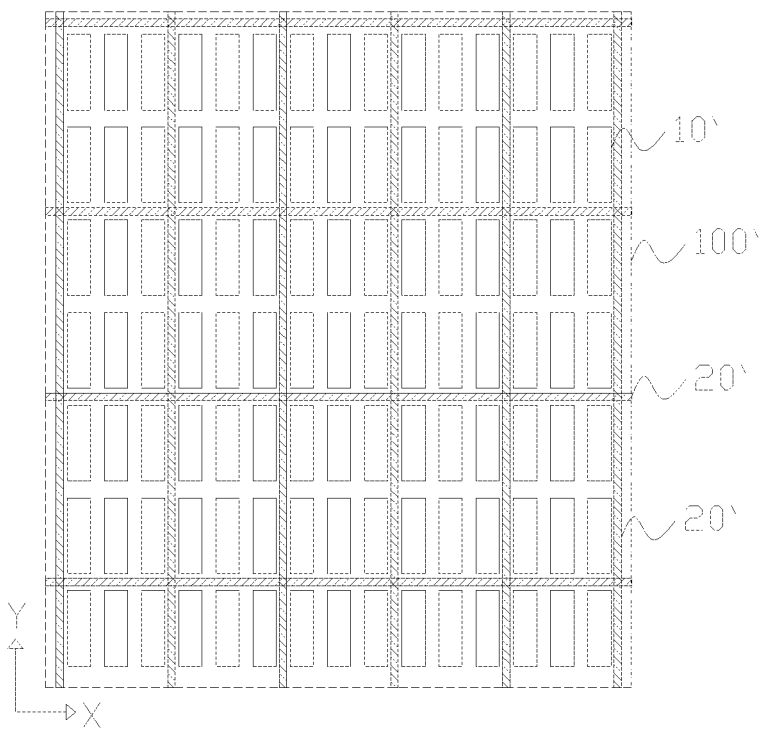
FIG. 1 is a schematic diagram of an antenna layout of a touch display panel in the prior art.

The technical solutions in the embodiments of the present application will be clearly and completely described below with reference to the accompanying drawings in the embodiments of the present application. Obviously, the described embodiments are only a part of the embodiments of the present application, but not all the embodiments. Based on the embodiments in this application, all other embodiments obtained by those skilled in the art without creative efforts shall fall within the protection scope of this application. Furthermore, it should be understood that, the specific embodiments described herein are only used to illustrate and explain the present application, but not to limit the present application. In the present application, unless otherwise stated, the directional words used such as "upper" and "lower" generally refer to the upper and lower parts of the device in actual use or working state, specifically the direction of the drawing in the drawings, and "inside" and "outside" refer to the outline of the device.

The following disclosure provides many different embodiments or examples for implementing different structures of the present application. To simplify the disclosure of the present application, the components and arrangements of specific examples are described below. Of course, they are only examples and are not intended to limit the present application. Furthermore, the present application may repeat reference numerals and/or reference letters in different instances. This repetition is for the purpose of simplicity and clarity and does not in itself indicate a relationship between the various embodiments and/or arrangements discussed. In addition, the present application provides examples of various specific processes and materials. However, those skilled in the art would appreciate the present application of other processes and/or the use of other materials. The following detailed descriptions are provided respectively. It should be noted that the description order of the following embodiments is not intended to limit the preferred order of the embodiments.

FIG. 1 is a schematic diagram of an antenna layout of a touch display panel in the prior art. As shown in FIG. 1, a touch display panel in the prior art includes pixel units 10' and an antenna group 20' located in a display area 100'. Antennas are provided in the antenna group 20'. The antenna group 20' is disposed between some adjacent pixel units 10', and the antenna group 20' is not disposed between some adjacent pixel units 10'. When the antennas in the antenna group 20' undergo a process offset, an aperture ratio of pixel units 10 adjacent to the antenna group 20' will be reduced. An aperture ratio of the pixel units 10' not adjacent to the antenna group 20' is not affected by a process offset. Therefore, the aperture ratio of a part of the pixel units 10' located in the display area 100' is larger than that of another part of the pixel units 10'. This causes a mura phenomenon of uneven brightness when the touch display panel displays a pure grayscale image, which seriously affects a display performance.

First Embodiment

Figure 2:
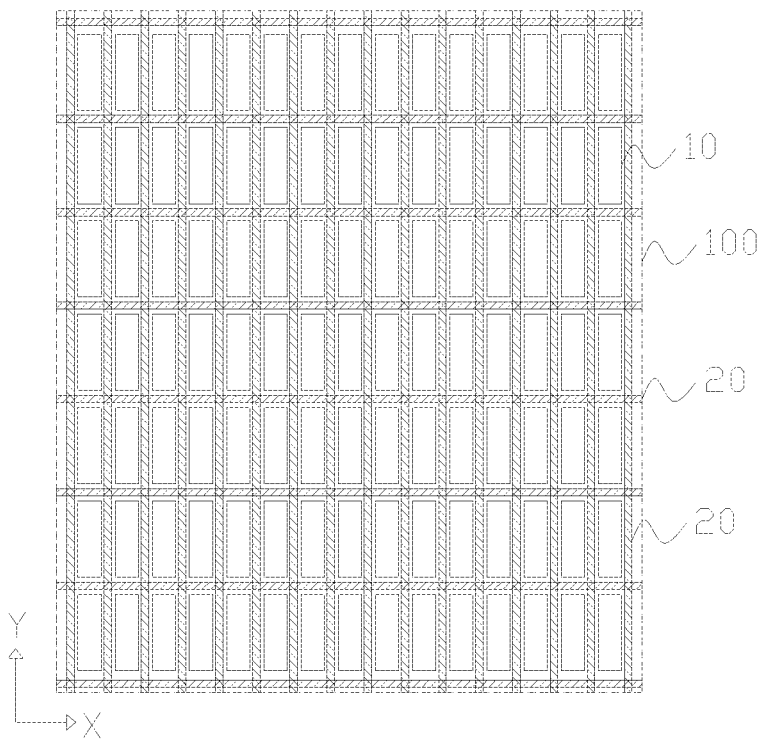
FIG. 2 is a schematic layout diagram of two antenna layers of a touch display panel provided by an embodiment of the present application.

To solve the above issues, embodiments of the present application provide a touch display panel. FIG. 2 is a schematic layout diagram of two antenna layers of a touch display panel provided by an embodiment of the present application. As shown in FIG. 2, the touch display panel has a display area 100 and a non-display area. The touch display panel includes pixel units 10 located in the display area 100 and two antenna layers. The pixel units 10 are arranged in an array. The two antennas are stacked and insulated from each other. Each of the antenna layers includes a plurality of antenna groups 20, and one of the antenna groups 20 is provided at a gap between the adjacent pixel units 10. Each of the antenna groups 20 includes at least one antenna. Extending directions of the antennas in each of the antenna layers are same and extending directions of the antennas in the two antenna layers are perpendicular to each other.

In the embodiment of the present application, an antenna group 20 including at least one antenna is disposed at the gap between the adjacent pixel units 10, so that when the touch display panel has a process offset, each of the pixel units 10 is affected by are consistent with the effect of the antenna offset described above. Therefore, aperture ratios of the pixel units 10 are the same, the difference in aperture ratios is eliminated, a mura phenomenon is avoided when the touch display panel performs a display function, and a display performance of the touch display panel is effectively improved.

In this embodiment, the two antenna layers are, for example, a first antenna layer and a second antenna layer, respectively. In the first antenna layer, the antenna groups 20 are arranged at intervals along a first direction X in sequence, and the antennas in each antenna group 20 extend along a second direction Y. In the second antenna layer, each antenna group 20 is arranged at intervals along the second direction Y in sequence, and the antennas in each antenna group 20 extend along the first direction X.

In this embodiment, the touch display panel includes a first substrate, a second substrate, and a liquid crystal layer. The liquid crystal layer is disposed between the first substrate and the second substrate. The first substrate is, for example, an array substrate, and the second substrate is, for example, a color filter substrate. Both the first antenna layer and the second antenna layer may be disposed on one of the first substrate and the second substrate or disposed on the first substrate and the second substrate respectively. Specifically, the first antenna layer and the second antenna layer disposed on the first substrate and/or the second substrate are both located on the first substrate and/or the second substrate facing a side of the liquid crystal layer. That is, the first antenna layer and the second antenna layer are integrated inside the touch display panel. Thereby, an in-cell structure is realized, which can effectively reduce the thickness of the touch display panel and realize light and thin touch interaction and display functions.

The touch display panel further includes a metal layer. The metal layer includes a plurality of data lines extending in the same direction, and one of the antenna layers is disposed on the same layer as the metal layer. For example, the first antenna layer and the metal layer are disposed on the same layer. Therefore, while realizing the function of the first antenna layer, the number of film layers of the touch display panel is not increased, which is beneficial to realizing the lightness and thinness of the touch display panel.

In this embodiment, the touch display panel is used to cooperate with an electromagnetic pen to realize electromagnetic touch interaction. Specifically, the electromagnetic pen includes a pressure sensor. When the user writes and draws on the touch display panel by means of the electromagnetic pen, after a pen tip of the electromagnetic pen is stressed, a pressure is transmitted to the pressure sensor through a pen core of the electromagnetic pen. The change of pressure causes the electromagnetic signal emitted by the electromagnetic pen to change. The antennas in the first antenna layer and the second antenna layer integrated in the touch display panel can receive the electromagnetic signal and calculate and obtain the electromagnetic pen in the abscissa and ordinate positions on the display area 100 of the touch display panel. This enables precise and sensitive touch interactions that recognize different pressures.

In this embodiment, a plurality of the antennas distributed in one of the antenna layers are uniformly divided into a plurality of antenna groups 20. One of the antenna groups 20 is disposed at the gap between the adjacent pixel units 10. In one of the antenna layers, the number of the antennas in each of the antenna groups 20 is the same, and a distance between the adjacent antenna groups 20 is the same. That is, one of the antenna groups 20 is disposed between adjacent pixel units 10 arranged in sequence along the first direction X at intervals. Each of the antenna groups 20 is provided with at least one antenna extending along the second direction Y, and the distance between adjacent antenna groups 20 is a fixed distance. One of the antenna groups 20 is disposed between adjacent pixel units 10 arranged in sequence along the second direction Y at intervals. Each of the antenna groups 20 is provided with at least one antenna extending along the first direction X, and the distance between adjacent antenna groups 20 is a fixed distance. Therefore, when an antenna in one of the antenna layers has a process offset, the antennas in the antenna layer have the same effect on the offset of each pixel unit 10. This eliminates the difference in aperture ratio, avoids a mura phenomenon when the touch display panel performs a display function, and effectively improves a display performance of the touch display panel.

In this embodiment, each antenna group 20 in the first antenna layer includes a plurality of antennas extending along the second direction Y. Each antenna group 20 in the second antenna layer includes a plurality of antennas extending along the first direction X, and the distance between adjacent antennas in each antenna group 20 is the same. That is, the distance between the adjacent antennas in any one of the antenna groups 20 is a fixed value.

The following takes the first antenna layer as an example to further describe the antenna distribution manner in each antenna group. Correspondingly, in the second antenna layer, the distribution mode of the antennas in each of the antenna groups is similar to the distribution mode of the antennas in the first antenna layer, and details are not described herein again in this embodiment of the present application.

Figure 3:
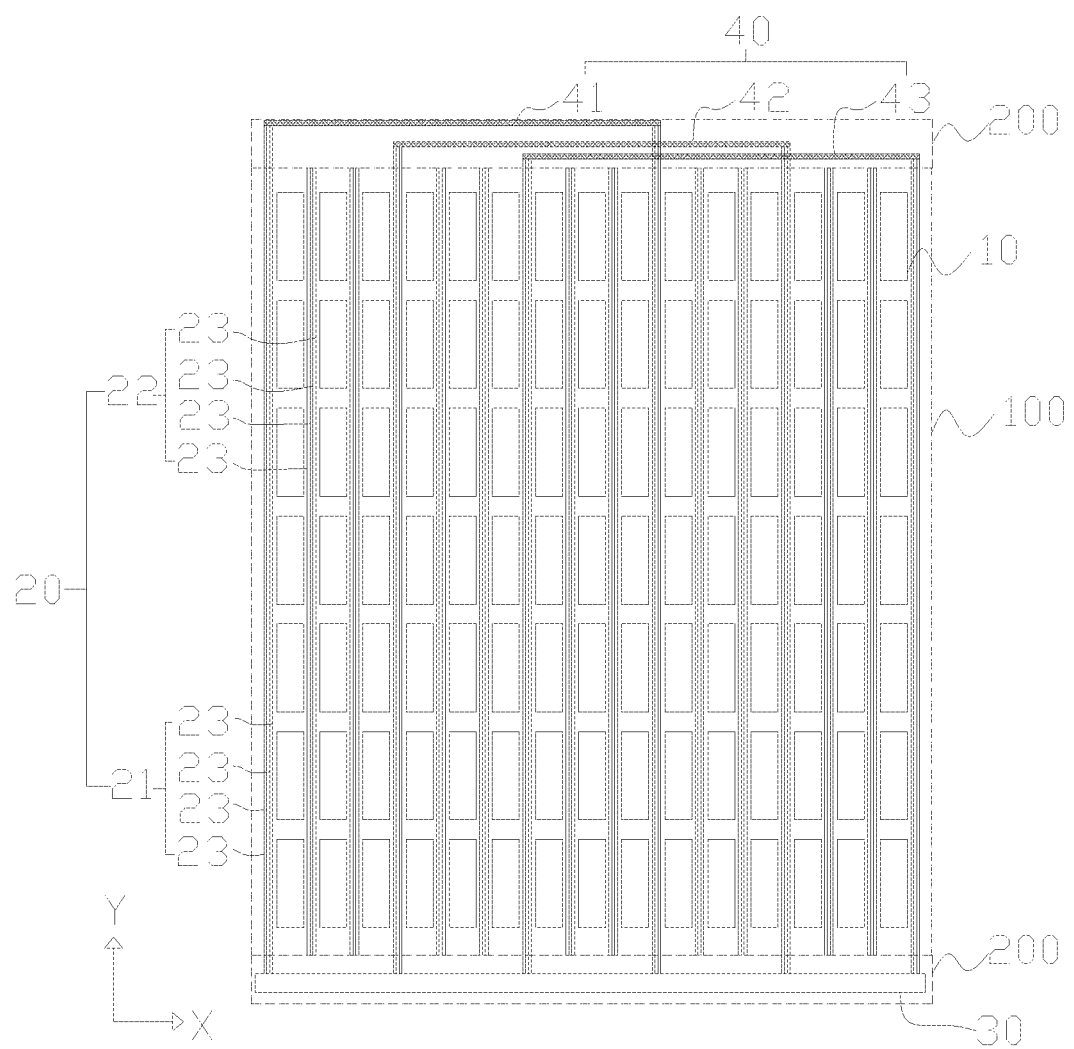
FIG. 3 is a schematic diagram of an antenna layout in an antenna layer of a touch display panel provided in a first embodiment of the present application.

FIG. 3 is a schematic diagram of an antenna layout in an antenna layer of a touch display panel provided in a first embodiment of the present application. As shown in FIG. 3, in the first antenna layer, the antennas 23 are uniformly distributed in the gaps between the adjacent pixel units 10. The plurality of antennas 23 are divided into a plurality of antenna groups 20. One of the antenna groups 20 is disposed at the gap between the adjacent pixel units 10. In one of the antenna layers, the number of the antennas 23 in each of the antenna groups 20 is the same, and the distance between the adjacent antenna groups 20 is the same. Specifically, each of the antenna groups 20 includes four antennas 23 extending along the second direction. It should be noted that the present application does not limit the specific number of antennas included in each of the antenna groups 20 in each antenna layer. In other embodiments of the present application, each of the antenna groups 20 may include other numbers of antennas than four.

In this embodiment, the multiple antenna groups in the first antenna layer include a first antenna group 21 and a second antenna group 22. The second antenna group 22 is located between two adjacent first antenna groups 21. The first antenna layer further includes peripheral wirings 40 and connecting wires 30 disposed in the non-display area 200. In the corresponding first antenna layer, two ends of each two groups of the first antenna group 21 are electrically connected through the peripheral wirings 40 and the connecting wires 30 respectively to form a closed signal channel. It should be noted that, in other embodiments of the present application, the peripheral wirings 40 and the connecting wires 30 may also be arranged at different layers from the first antenna layer.

In this embodiment, the first antenna layer includes one of the connecting wires 30 and a plurality of groups of the peripheral wirings 40. Each two groups of the first antenna groups 21 are connected to one group of the peripheral wirings 40 correspondingly. In the first antenna layer, one end of the first antenna group 21 is electrically connected to the connecting wires 30. Another end of the first antenna group 21 is electrically connected to the corresponding peripheral wirings 40. Specifically, the multiple groups of peripheral wirings include a first group of peripheral wirings 41, a second group of peripheral wirings 42, and a third group of peripheral wirings 43. The first group of peripheral wirings 41, the second group of peripheral wirings 42, and the third group of peripheral wirings 43 are respectively electrically connected to the two first antenna groups 21.

In this embodiment, in the first antenna layer, the second antenna group 22 is insulated from the connecting wires 30 and the peripheral wirings 40. That is, the connection between the antenna 23 in each of the second antenna groups 22 and the connecting wires 30 is in an open circuit state. The antennas 23 in each of the second antenna groups 22 and the peripheral wirings 40 are in an open circuit state. Therefore, the antennas 23 in each of the second antenna groups 22 are always in a floating state when the touch display panel operates.

In this embodiment, two adjacent first antenna groups 21 belong to different signal channels. A fixed number of second antenna groups 22 are disposed between two adjacent first antenna groups 21 belonging to different signal channels. The antennas in the second antenna group 22 are all in a floating state. Therefore, the touch display panel provided in the first embodiment of the present application can eliminate the mura issue caused by the process offset and further improve the display image performance. This ensures a separation distance between different signal channels and can effectively ensure a strength of the sensing signal of the touch display panel and the touch precision.

Second Embodiment

Figure 4:
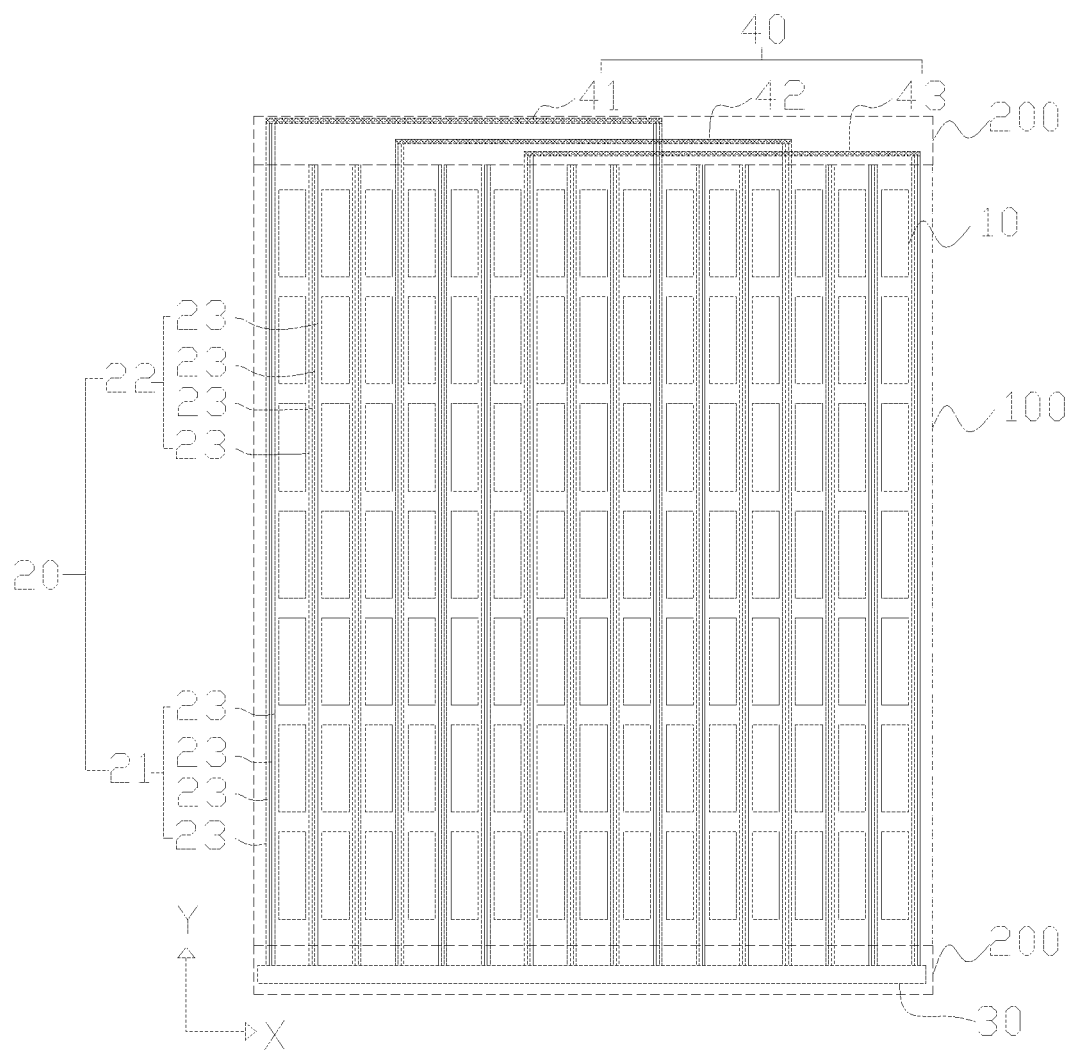
FIG. 4 is a schematic diagram of an antenna layout in an antenna layer of a touch display panel provided in a second embodiment of the present application.

FIG. 4 is a schematic diagram of an antenna layout in an antenna layer of a touch display panel provided in a second embodiment of the present application. As shown in FIG. 4, the second embodiment of the present application provides a touch display panel. The touch display panel has a display area 100 and a non-display area 200. The touch display panel includes pixel units 10 located in the display area 100 and two antenna layers. The pixel units 10 are arranged in an array. The two antennas are stacked and insulated from each other. Each of the antenna layers includes a plurality of antenna groups 20, and one of the antenna groups 20 is provided at the gap between the adjacent pixel units 10. Each of the antenna groups 20 includes at least one antenna. Extending directions of the antennas in each of the antenna layers are the same and extending directions of the antennas in the two antenna layers are perpendicular to each other. The two antenna layers are a first antenna layer and a second antenna layer, respectively.

The touch display panel provided in the second embodiment of the present application is similar to the first embodiment, in that each of the antenna layers includes one of the connecting wires 30 and a plurality of groups of the peripheral wires 40 disposed in the non-display area 200. In one of the antenna layers, one end of the first antenna group 21 is electrically connected to the connecting wires 30. The other end of the first antenna group 21 is electrically connected to the corresponding peripheral wirings 40, and the same parts of this embodiment are not repeated here. The difference is that in one of the antenna layers, the second antenna group 22 is electrically connected to the connecting wires 30 and is insulated from the peripheral wirings 40.

Continuing to take the first antenna layer as an example, each of the second antenna groups 22 includes a plurality of antennas 23 extending along the second direction Y. Each of the antennas 23 in each of the second antenna groups 22 is electrically connected to the connecting wires 30. In addition, in the first antenna layer, each of the antennas 23 in each of the first antenna groups 21 is also electrically connected to the connecting wires 30. Therefore, each of the antennas 23 in each of the second antenna groups 22 is connected in parallel with each of the antennas 23 in each of the first antenna groups 21. This keeps the voltages of the antennas 23 in the first antenna layer in the display area 100 consistent. This can effectively avoid the display uniformity issue caused by different voltages on the antennas 23 on both sides of the pixel unit 10. This can further improve the display performance of the touch display panel while eliminating image performance issues caused by process offsets.

Third Embodiment

Figure 5:
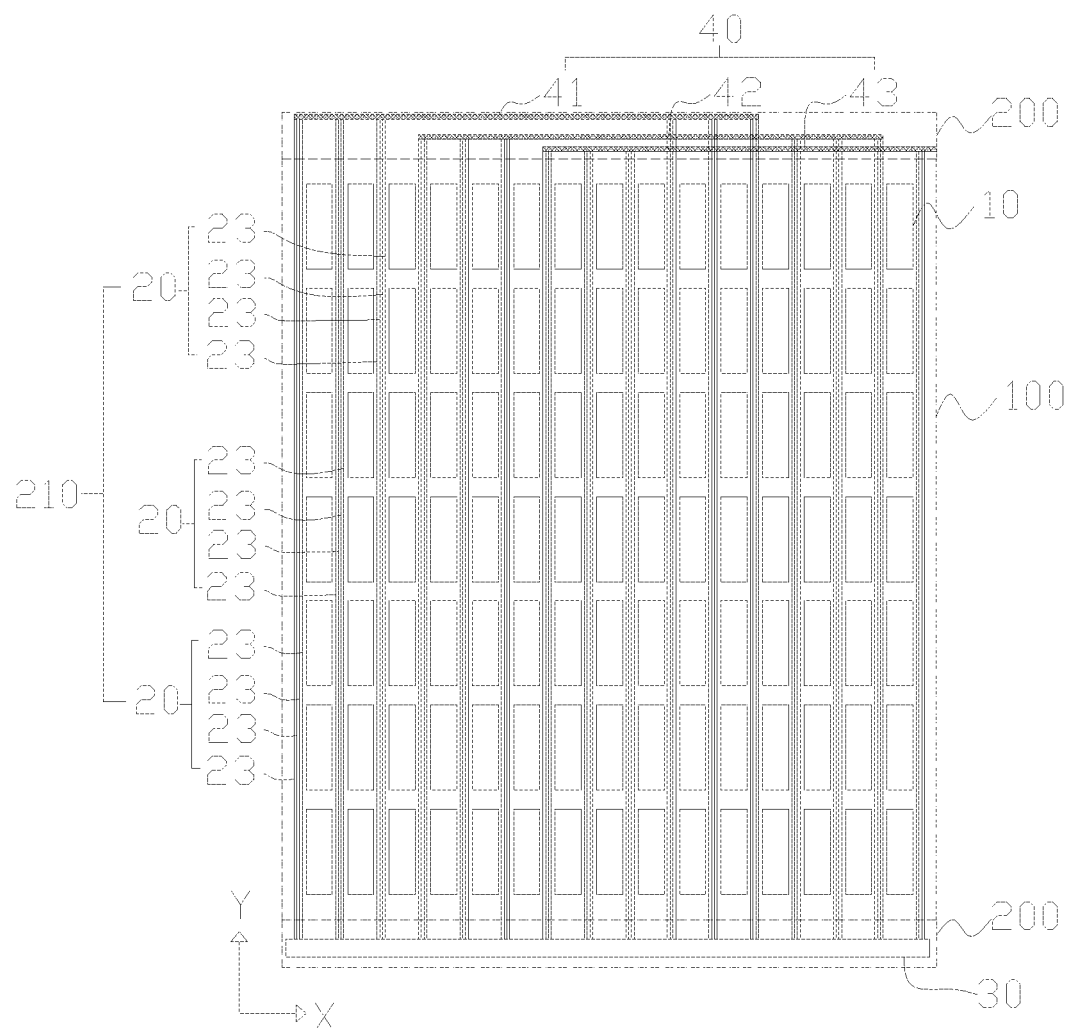
FIG. 5 is a schematic diagram of an antenna layout in an antenna layer of a touch display panel provided in a third embodiment of the present application.

FIG. 5 is a schematic diagram of an antenna layout in an antenna layer of a touch display panel provided in a third embodiment of the present application. As shown in FIG. 5, the third embodiment of the present application provides a touch display panel, and the touch display panel has a display area 100 and a non-display area 200. The touch display panel includes pixel units 10 located in the display area 100 and two antenna layers. The pixel units 10 are arranged in an array. The two antennas are stacked and insulated from each other. Each of the antenna layers includes a plurality of antenna groups 20, and one of the antenna groups 20 is provided at the gap between the adjacent pixel units 10. Each of the antenna groups 20 includes at least one antenna. Extending directions of the antennas in each of the antenna layers are the same and extending directions of the antennas in the two antenna layers are perpendicular to each other. The two antenna layers are a first antenna layer and a second antenna layer, respectively.

The touch display panel provided in the third embodiment of the present application is similar to the first embodiment and the second embodiment. For example, each of the antenna layers includes one of the connecting wires 30 and a plurality of groups of the peripheral wirings 40 disposed in the non-display area 200, the same parts in this embodiment will not be repeated here. The difference is that in one of the antenna layers, the multiple the antenna groups 20 are uniformly divided into a plurality of antenna groups 210. Each of the antenna groups 210 includes a plurality of adjacent antenna groups 20, and each of the antenna groups 210 includes the same number of the antenna groups 20. In the corresponding antenna layer, two ends of each of the two antenna groups 210 are respectively electrically connected through the peripheral wirings 40 and the connecting wires 30 to form a closed signal channel. That is, every two antenna groups 210 correspond to a group of the peripheral wirings 40.

Continuing to take the first antenna layer as an example, in the first antenna layer, each antenna group 20 includes a plurality of antennas 23 extending along the second direction Y. A plurality of adjacent antenna groups 20 form an antenna group 210. One end of the antenna group 210 is electrically connected to the connecting wires 30. The other end of the antenna group 210 is electrically connected to the corresponding peripheral wirings 40. Specifically, the multiple groups of peripheral wirings 40 include a first group of peripheral wirings 41, a second group of peripheral wirings 42, and a third group of peripheral wirings 43. The first group of peripheral wirings 41, the second group of peripheral wirings 42, and the third group of peripheral wirings 43 are respectively electrically connected to the two antenna groups 210.

In this embodiment, two adjacent antenna groups 210 belong to different signal channels. That is, the two adjacent antenna groups 210 are respectively electrically connected to different groups of peripheral wirings 40.

In this embodiment, every two of the antenna groups 210, the connecting wires 30, and a group of peripheral wires 40 form a closed signal channel. A plurality of adjacent antenna groups 20 form an antenna group 210. Each antenna group 20 includes a plurality of antennas 23. Therefore, the touch display panel forms more antennas 23 for each signal channel, thereby effectively reducing the resistance of the sensing signal during channel transmission. This can further improve the strength of the induction signal while eliminating the image performance issues caused by process offsets.

In conclusion, the present application provides a touch display panel. The touch display panel has a display area and a non-display area. The touch display panel includes pixel units located in the display area and two antenna layers. The pixel units are arranged in an array. The two antennas are stacked and insulated from each other. Each antenna layer includes a plurality of antenna groups, and each of the gaps between adjacent pixel units is provided with an antenna group. Each antenna group includes at least one antenna.

The extending directions of the antennas in each antenna layer are the same, and the extending directions of the antennas in the two antenna layers are perpendicular to each other. In the present application, an antenna group including at least one antenna is arranged at the gap between adjacent pixel units, so that when the touch display panel has a process offset, each pixel unit is affected by the antenna offset in the same way. Therefore, there is no difference in the aperture ratio, the generation of the mura phenomenon is avoided, and the display performance of the touch display panel is effectively improved.

The touch display panel provided by the embodiments of the present application has been described in detail above. Specific examples are used herein to illustrate the principles and implementations of the present application. The descriptions of the above embodiments are only used to help understand the method and the core idea of the present application. In addition, for those skilled in the art, according to the idea of the present application, there will be changes in the specific embodiments and application scope. In conclusion, the content of this specification should not be construed as a limitation on the present application.

What is claimed is:

1. A touch display panel having a display area and a non-display area, wherein the touch display panel comprises:
   pixel units located in the display area and two antenna layers, wherein the pixel units are arranged in an array, the two antennas are stacked and insulated from each other, each of the antenna layers comprises a plurality of antenna groups, and one of the antenna groups is provided at a gap between adjacent pixel units, each of the antenna groups comprises at least one antenna, extending directions of the antennas in each of the antenna layers are same, and extending directions of the antennas in the two antenna layers are perpendicular to each other;
   wherein in one of the antenna layers, distances between adjacent antenna groups are same, and a number of the antennas in each of the antenna groups is same;
   wherein the plurality of the antenna groups in each of the antenna layers comprises first antenna groups and second antenna groups, the second antenna group is located between two adjacent first antenna groups, each of the antenna layers further comprises peripheral wirings and connecting wires arranged in the non-display area, in one of the antenna layers, two ends of the first antenna groups of each two groups are respectively electrically connected through the peripheral wirings and the connecting wires;
   wherein each of the antenna layers comprises one of the connecting wires and a plurality of groups of the peripheral wirings, in one of the antenna layers, one end of the first antenna group is electrically connected to the connecting wires, and another end of the first antenna group is electrically connected to corresponding peripheral wirings;
   wherein in one of the antenna layers, the second antenna group is insulated from the connecting wires and the peripheral wirings.

2. The touch display panel according to claim 1, wherein two adjacent first antenna groups belong to different signal channels.

3. The touch display panel according to claim 1, wherein each of the antenna layers further comprises peripheral wirings and connecting wires disposed in the non-display area, in one of the antenna layers, a plurality of the antenna groups are equally divided into a plurality of antenna groups, each of the antenna groups comprises a plurality of adjacent antenna groups, and each of the antenna groups comprises a same number of the antenna groups, in one of the antenna layers, two ends of each of the two antenna groups are electrically connected through the peripheral wiring and the connecting wires, respectively.

4. The touch display panel according to claim 3, wherein each of the antenna layers comprises one of the connecting wires and a plurality of groups of the peripheral wirings, in one of the antenna layers, one end of the antenna group is electrically connected to the connecting wires, and another end of the antenna group is electrically connected to corresponding peripheral wirings.

5. The touch display panel according to claim 3, wherein two adjacent antenna groups belong to different signal channels.

6. A touch display panel having a display area and a non-display area, wherein the touch display panel comprises:
   pixel units located in the display area and two antenna layers, wherein the pixel units are arranged in an array, the two antennas are stacked and insulated from each other, each of the antenna layers comprises a plurality of antenna groups, and one of the antenna groups is provided at a gap between adjacent pixel units, each of the antenna groups comprises at least one antenna, extending directions of the antennas in each of the antenna layers are same, and extending directions of the antennas in the two antenna layers are perpendicular to each other;
   wherein in one of the antenna layers, distances between adjacent antenna groups are same, and a number of the antennas in each of the antenna groups is same;
   wherein the plurality of the antenna groups in each of the antenna layers comprises first antenna groups and second antenna groups, the second antenna group is located between two adjacent first antenna groups, each of the antenna layers further comprises peripheral wirings and connecting wires arranged in the non-display area, in one of the antenna layers, two ends of the first antenna groups of each two groups are respectively electrically connected through the peripheral wirings and the connecting wires;
   wherein each of the antenna layers comprises one of the connecting wires and a plurality of groups of the peripheral wirings, in one of the antenna layers, one end of the first antenna group is electrically connected to the connecting wires, and another end of the first antenna group is electrically connected to corresponding peripheral wirings;
   wherein in one of the antenna layers, the second antenna group is electrically connected to the connecting wires and insulated from the peripheral wirings.

7. The touch display panel according to claim 6, wherein two adjacent first antenna groups belong to different signal channels.

8. The touch display panel according to claim 6, wherein each of the antenna layers further comprises peripheral wirings and connecting wires disposed in the non-display area, in one of the antenna layers, a plurality of the antenna groups are equally divided into a plurality of antenna groups, each of the antenna groups comprises a plurality of adjacent antenna groups, and each of the antenna groups comprises a same number of the antenna groups, in one of the antenna layers, two ends of each of the two antenna groups are electrically connected through the peripheral wiring and the connecting wires, respectively.

9. The touch display panel according to claim 8, wherein each of the antenna layers comprises one of the connecting wires and a plurality of groups of the peripheral wirings, in one of the antenna layers, one end of the antenna group is electrically connected to the connecting wires, and another end of the antenna group is electrically connected to corresponding peripheral wirings.

10. The touch display panel according to claim 8, wherein two adjacent antenna groups belong to different signal channels.

11. A touch display panel having a display area and a non-display area, wherein the touch display panel comprises:
pixel units located in the display area and two antenna layers, wherein the pixel units are arranged in an array, the two antennas are stacked and insulated from each other, each of the antenna layers comprises a plurality of antenna groups, and one of the antenna groups is provided at a gap between adjacent pixel units, each of the antenna groups comprises at least one antenna, extending directions of the antennas in each of the antenna layers are same, and extending directions of the antennas in the two antenna layers are perpendicular to each other;
wherein the touch display panel further comprises a metal layer, the metal layer comprises a plurality of data lines extending in a same direction, and one of the antenna layers is disposed on a same layer as the metal layer.

12. The touch display panel according to claim 11, wherein in one of the antenna layers, distances between adjacent antenna groups are same, and a number of the antennas in each of the antenna groups is same.

13. The touch display panel according to claim 12, wherein the plurality of the antenna groups in each of the antenna layers comprises first antenna groups and second antenna groups, the second antenna group is located between two adjacent first antenna groups, each of the antenna layers further comprises peripheral wirings and connecting wires arranged in the non-display area, in one of the antenna layers, two ends of the first antenna groups of each two groups are respectively electrically connected through the peripheral wirings and the connecting wires.

14. The touch display panel according to claim 13, wherein each of the antenna layers comprises one of the connecting wires and a plurality of groups of the peripheral wirings, in one of the antenna layers, one end of the first antenna group is electrically connected to the connecting wires, and another end of the first antenna group is electrically connected to corresponding peripheral wirings.

15. The touch display panel according to claim 14, wherein in one of the antenna layers, the second antenna group is insulated from the connecting wires and the peripheral wirings.

16. The touch display panel according to claim 14, wherein in one of the antenna layers, the second antenna group is electrically connected to the connecting wires and insulated from the peripheral wirings.

17. The touch display panel according to claim 14, wherein two adjacent first antenna groups belong to different signal channels.

18. The touch display panel according to claim 12, wherein each of the antenna layers further comprises peripheral wirings and connecting wires disposed in the non-display area, in one of the antenna layers, a plurality of antenna groups are equally divided into a plurality of antenna groups, each of the antenna groups comprises a plurality of adjacent antenna groups, and each of the antenna groups comprises a same number of the antenna groups, in one of the antenna layers, two ends of each of the two antenna groups are electrically connected through the peripheral wiring and the connecting wires, respectively.

19. The touch display panel according to claim 18, wherein each of the antenna layers comprises one of the connecting wires and a plurality of groups of the peripheral wirings, in one of the antenna layers, one end of the antenna group is electrically connected to the connecting wires, and another end of the antenna group is electrically connected to corresponding peripheral wirings.

20. The touch display panel according to claim 18, wherein two adjacent antenna groups belong to different signal channels.

* * * * *